(12) United States Patent
Bar-Menachem et al.

(10) Patent No.: US 10,095,993 B1
(45) Date of Patent: Oct. 9, 2018

(54) METHODS AND APPARATUS FOR CONFIGURING GRANULARITY OF KEY PERFORMANCE INDICATORS PROVIDED BY A MONITORED COMPONENT

(75) Inventors: Ika Bar-Menachem, Herzelia (IL); Oded Peer, Ranana (IL)

(73) Assignee: EMC IP Holding Company LLC, Hopkinton, MA (US)

(*) Notice: Subject to any disclaimer, the term of this patent is extended or adjusted under 35 U.S.C. 154(b) by 597 days.

(21) Appl. No.: 13/617,090

(22) Filed: Sep. 14, 2012

(51) Int. Cl.
*G06Q 10/06* (2012.01)

(52) U.S. Cl.
CPC .............................. *G06Q 10/06393* (2013.01)

(58) Field of Classification Search
CPC ................................................ G06Q 10/06393
USPC ......................................................... 705/7.39
See application file for complete search history.

(56) References Cited

U.S. PATENT DOCUMENTS

| | | | | |
|---|---|---|---|---|
| 6,519,638 | B1* | 2/2003 | Forman | G06F 11/3466 709/223 |
| 7,647,131 | B1* | 1/2010 | Sadowski | G05B 23/0297 700/108 |
| 7,657,333 | B2* | 2/2010 | Bradford | G05B 21/02 700/34 |
| 7,933,666 | B2* | 4/2011 | Campbell | G05B 19/4183 700/74 |
| 7,962,440 | B2* | 6/2011 | Baier | G05B 19/41875 706/62 |
| 8,745,647 | B1* | 6/2014 | Shin | H04N 21/442 725/10 |
| 2003/0187675 | A1* | 10/2003 | Hack | G06Q 10/06393 705/7.39 |
| 2006/0149579 | A1* | 7/2006 | Weild, IV | G06Q 10/06393 705/7.39 |
| 2008/0027789 | A1* | 1/2008 | Busch | G06Q 10/0639 705/7.38 |
| 2008/0114571 | A1* | 5/2008 | Campbell | G05B 19/4183 702/189 |
| 2009/0070783 | A1* | 3/2009 | Schmidt | G06Q 10/06 719/318 |
| 2009/0082919 | A1* | 3/2009 | Hershey | F02D 41/249 701/33.4 |
| 2009/0089231 | A1* | 4/2009 | Baier | G05B 19/41875 706/45 |
| 2009/0089558 | A1* | 4/2009 | Bradford | G05B 21/02 712/225 |

(Continued)

*Primary Examiner* — Jeff Zimmerman
(74) *Attorney, Agent, or Firm* — Ryan, Mason & Lewis, LLP

(57) ABSTRACT

Methods and apparatus are provided for configuring the granularity of key performance indicators that are available from a monitored component. A granularity of a key performance indicator provided by a monitored component can be configured by creating a plurality of instances of a statistics collector object, wherein each instance of the statistics collector object collects information for a different context of the key performance indicator; updating an indicator value for a corresponding instance of the statistics collector object when an activity occurs for the context of the key performance indicator; and providing the indicator value for a given context of the key performance indicator to a monitoring object. The configurable granularity can be specified by the product, for example, using an application programming interface.

18 Claims, 6 Drawing Sheets

(56) References Cited

U.S. PATENT DOCUMENTS

| | | | |
|---|---|---|---|
| 2009/0112678 A1* | 4/2009 | Luzardo | G06N 5/02 705/7.38 |
| 2009/0172674 A1* | 7/2009 | Bobak | G06F 11/1482 718/101 |
| 2009/0199047 A1* | 8/2009 | Vaitheeswaran | G06F 11/3409 714/47.2 |
| 2009/0199160 A1* | 8/2009 | Vaitheeswaran | G06F 11/3414 717/124 |
| 2012/0117226 A1* | 5/2012 | Tanaka | H04L 41/0266 709/224 |
| 2012/0296624 A1* | 11/2012 | Jeng | G06Q 10/0639 703/22 |

\* cited by examiner

FIG. 5

```
public class RiskEngineStatsCollector implements
RiskEngineStatsCollectorMBean {
        private AtomicInteger numberOfAnalyzeRequest = new
AtomicInteger ( 0 );
        private AtomicInteger numberOfFailedAnalyzeRequests = new
AtomicInteger ( 0 );
        @Override
        public int getNumberOfAnalyzeRequests() {
                return numberOfAnalyzeRequests.get();
        }
        @Override
        public int getNumberOfFailedAnalyzeRequests() {
                return numberOfFailedAnalyzeRequests.get();
        }
        public void incNumberOfAnalyzeRequests() {
                numberOfAnalyzeRequests.incrementAndGet();
        }
        public void incNumberOfFailedAnalyzeRequests() {
                numberOfFailedAnalyzeRequests.incrementAndGet();
        }
}
```

FIG. 6

```
                                                            ┌─600
    private RiskEngineStatsCollector RiskEngineStatsCollector;
    public void setRiskEngineStatsCollector(
RiskEngineStatsCollector RiskEngineStatsCollector ) {
        this.RiskEngineStatsCollector = RiskEngineStatsCollector;
    } public Object analyze( Fact fact_map ) {
    ...
    if ( RiskEngineStatsCollector != null ) {
        RiskEngineStatsCollector.incNumberOfAnalyzeRequests();
    }
    IRiskState risk_state = null;
    try {
            doSomething(); // calculate the risk
    }
    catch ( RuntimeException e ) {
            if ( RiskEngineStatsCollector != null ) {
    RiskEngineStatsCollector.incNumberOfFailedAnalyzeRequests(
);
            }
    }
    ...
}
```

FIG. 7

```
private static RiskEngineStatsCollector RiskEngineStatsCollector = new
RiskEngineStatsCollector();
private CRiskEngine engine = new CRiskEngine();

public static void main ( String[] args ) {
        MBeanServer mbs = ManagementFactory.getPlatFormMbeanServer();
        ObjectName objectName = new ObjectName(
"com.rsa.risk:name=RiskEngineStatsCollector" );
        mbs.registerMBean( RiskEngineStatsCollector, objectName );
        engine.setRiskEngineStatsCollector( RiskEngineStatsCollector );
        ...
        engine.analyze( factMap );
        ...
}
```

METHODS AND APPARATUS FOR CONFIGURING GRANULARITY OF KEY PERFORMANCE INDICATORS PROVIDED BY A MONITORED COMPONENT

FIELD OF THE INVENTION

The present invention relates generally to techniques for monitoring the performance and other characteristics of products and components embedded in such products.

BACKGROUND OF THE INVENTION

Many commercial products incorporate components that are monitored. The data that is collected regarding the monitored component is then reported to a monitoring object, such as a human. The collected data is often reported as a performance measurement or a key performance indicator (KPI). KPIs are often used to characterize the performance, time to complete a task, resource usage, maintenance issues and/or additional characteristics of the monitored component. For example, for a product that incorporates a cache component, the KPIs may specify the cache size, a cache refresh timestamp, a number of cache hits and a number of cache misses.

Currently, KPIs are specified by the providers of the monitored components and the products that incorporate the monitored components cannot control the scope of the reported data. A need therefore exists for techniques that allow a product to configure the granularity of key performance indicators that are available from a monitored component.

SUMMARY OF THE INVENTION

The present invention in the illustrative embodiments described herein provides methods and apparatus for configuring the granularity of key performance indicators that are available from a monitored component. In accordance with an aspect of the invention, a granularity of a key performance indicator provided by a monitored component can be configured by creating a plurality of instances of a statistics collector object, wherein each instance of the statistics collector object collects information for a different context of the key performance indicator; updating an indicator value for a corresponding instance of the statistics collector object when an activity occurs for the context of the key performance indicator; and providing the indicator value for a given context of the key performance indicator to a monitoring object. The configurable granularity can be specified by the product, for example, using an application programming interface.

Generally, the configurable granularity allows different contexts of the key performance indicator to be monitored and reported. The key performance indicator corresponds to one or more of performance, time to complete a task, resource usage and maintenance issues related to the monitored component.

The key performance indicator configuration techniques of the illustrative embodiments overcome one or more of the problems associated with the conventional techniques described previously, and permit products to control the granularity of the key performance indicators related to the monitored components that are incorporated into the product. These and other features and advantages of the present invention will become more readily apparent from the accompanying drawings and the following detailed description.

BRIEF DESCRIPTION OF THE DRAWINGS

FIG. 5 illustrates an exemplary implementation of a statistics collector object that collects measurements in accordance with aspects of the invention;

FIG. 6 illustrates exemplary pseudo code that can be employed by the monitored components of FIG. 1 to collect the KPI information with the granularity specified by the product of FIG. 1;

FIG. 7 illustrates exemplary pseudo code that can be employed by the product of FIG. 1 to monitor the KPIs having the desired granularity.

DETAILED DESCRIPTION

Aspects of the present invention provide methods and apparatus for configuring the granularity of key performance indicators that are available from a monitored component. According to one aspect of the invention, improved granularity is achieved by creating a plurality of instances of a statistics collector object, where each instance of the statistics collector object collects information for a different context of the key performance indicator. Thereafter, an indicator value for a corresponding instance of the statistics collector object is updated when an activity occurs for the associated context of the key performance indicator.

Figure 1:
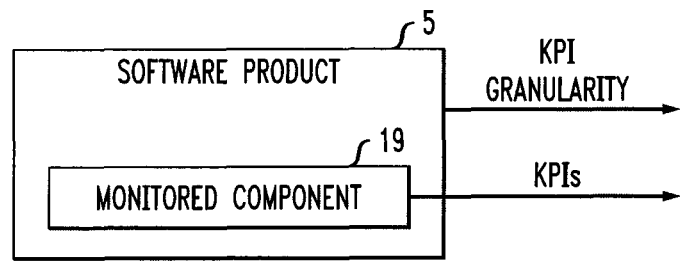
FIG. 1 illustrates an exemplary product that incorporates a monitored component in which the present invention can be employed.

FIG. 1 illustrates an exemplary software product 5 that incorporates one or more monitored components 19 in which the present invention can be employed. In general, the monitored component 19 can comprise any component that is embedded in a product and provides one or more KPIs. In one example, the software product 5 can comprise an adaptive authentication product, a knowledge based authentication product or other products that provide a security layer for online credit and debit card transactions, such as Verified by Visa™, MasterCard SecureCode™, and SafeKey™ from American Express. In addition, the monitored component 19 can comprise, for example, a risk engine or a prediction engine.

For a more detailed discussion of suitable adaptive authentication products, see, for example, U.S. patent application Ser. No. 13/538,120, filed Jun. 29, 2012, entitled "Active Learning-Based Fraud Detection in Adaptive Authentication Systems," now U.S. Pat. No. 8,875,267; or U.S. patent application Ser. No. 13/537,958, filed Jun. 29, 2012, entitled "Similarity-Based Fraud Detection in Adaptive Authentication Systems," now U.S. Pat. No. 8,856,923, each incorporated by reference herein.

For a more detailed discussion of suitable knowledge based authentication products, see, for example, U.S. patent application Ser. No. 13/436,125 (now U.S. Pat. No. 9,021, 553), filed Mar. 30, 2012, entitled "Methods and Apparatus for Fraud Detection and Remediation in Knowledge-Based Authentication;" or U.S. patent application Ser. No. 13/436, 080 (now U.S. Pat. No. 9,009,844), filed Mar. 30, 2012, entitled "Methods and Apparatus for Knowledge-Based Authentication Using Historically-Aware Questionnaires," each incorporated by reference herein.

In further examples, the software product 5 can be:

a stock trading platform that incorporates a rule base as a monitored component 19;

a weather forecast product that incorporates a prediction engine as a monitored component 19; and a social network website that incorporates a hardware device, such as a cache as a monitored component 19.

When the monitored component 19 is a rule engine, an exemplary KPI can comprise a number of rules processed until a decision is reached.

When the monitored component 19 is a cache component, an exemplary KPI can comprise a cache hit/miss ratio.

As previously indicated, aspects of the present invention permit the software product 5 to configure the granularity of the KPIs that are available from a monitored component 19. In particular, an instance of a statistics collector object is provided to collect information for each desired context of the KPI. For example, in an online banking setting, the context may be each different transaction type (e.g., login, payment, deposit). In a further example, in a stock trading setting, the exemplary KPIs can comprise trading volume and execution speed and the different contexts can comprise different stock exchange markets.

In a social network setting, the monitored component 19 can comprise an SQL (Structured Query Language) query engine that monitors KPIs such as number of rows queried and number of blocks retrieved from the database, and the different contexts can comprise different types of users (e.g., regular, Silver, and Gold level customers).

Figure 2:
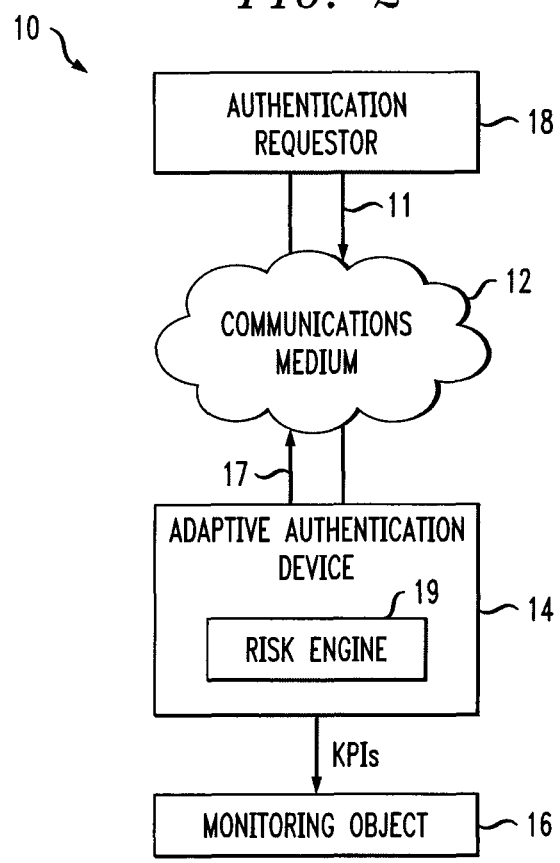
FIG. 2 illustrates a network environment for an exemplary authentication product incorporating features of the present invention.

FIG. 2 illustrates a network environment 10 for an exemplary authentication product 14 incorporating features of the present invention. Network environment 10 includes communications medium 12, authentication requestor 18 and adaptive authentication device 14.

Communication medium 12 provides connections between adaptive authentication device 14 and authentication requestor 18. The communications medium 12 may implement a variety of protocols such as TCP/IP (Transmission Control Protocol/Internet Protocol), UDP (User Datagram Protocol), ATM (Asynchronous Transfer Mode), Ethernet, Fibre Channel, combinations thereof, and the like. Furthermore, the communications medium 12 may include various components (e.g., cables, switches/routers, gateways/bridges, NAS/SAN (Network Attached Storage/Storage Area Network) appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Authentication requestor 18 is constructed and arranged to receive, from a user, requests to access data and send, to adaptive authentication device 14, request 11 to authenticate the user. Authentication requestor 18 is further constructed and arranged to receive an adaptive authentication result 17 which indicates whether the user is a high risk of being a fraudulent user.

Request 11 takes the form of a message that includes various facts and their values; such messages are embedded in a payload of a data packet. Request 11 typically includes a username for the user and a timestamp indicating a time.

Adaptive authentication device 14 is constructed and arranged to receive authentication request 11 from authentication requestor 18. Adaptive authentication device 14 is also constructed and arranged to generate adaptive authentication result 17 based on request 11 and a baseline profile of the user, a baseline profile including a history of requests from a user over several previous time windows. Adaptive authentication device 14 is further constructed and arranged to send adaptive authentication result 17 to authentication requestor 18.

Adaptive authentication device 14 is constructed and arranged to perform adaptive authentication operations on request 11 and takes the form of a desktop computer, laptop, server or tablet computer. Specifically, adaptive authentication device 14 receives request 11 from authentication requestor 18 and accesses a baseline profile having a user identifier matching the username of request 11. Further details concerning adaptive authentication device 14 are described below with regard to FIG. 3.

In accordance with one aspect of the invention, adaptive authentication device 14 incorporates a monitored component 19 embodied as an exemplary risk engine. The adaptive authentication device 14 provides one or more KPIs to a monitoring object 16, such as another computing device or a human. Generally, the monitoring object 16 consumes the KPIs generated in accordance with aspects of the present invention.

Figures 3, 4:
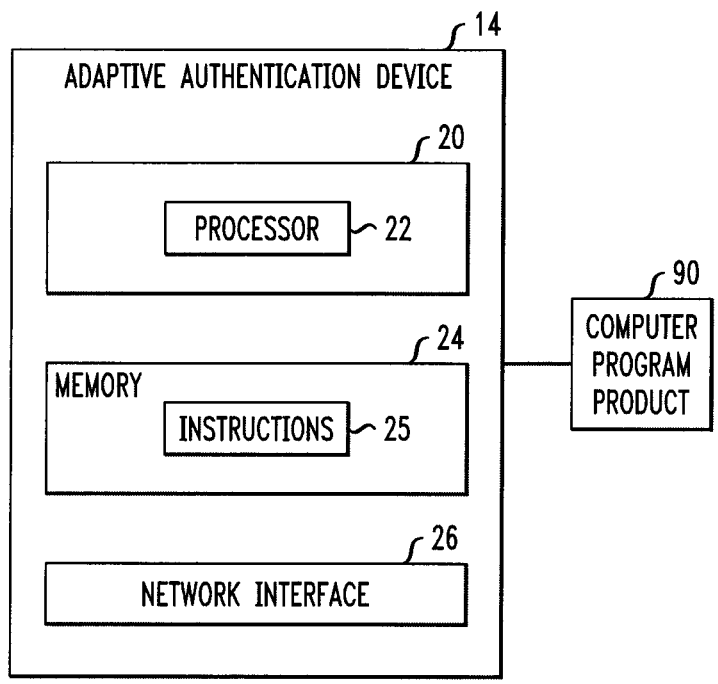
FIG. 3 is a schematic diagram illustrating an adaptive authentication device within the network environment shown in FIG. 2.
FIG. 4 illustrates an exemplary application programming interface that a product can use in accordance with aspects of the invention to retrieve KPIs from a monitored component.

FIG. 3 is a schematic diagram illustrating an adaptive authentication device 14 within the network environment 10 shown in FIG. 2. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is further configured to store data from database 16 and request 11. Memory 24 generally takes the form of, e.g., random access memory, flash memory or a non-volatile memory.

Processor 22 can take the form of, but is not limited to, an Intel or AMD-based MPU (microprocessor unit), and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 2, adaptive authentication result 17 indicates a likelihood that request 11 is associated with fraudulent activity. Processor 22 generates adaptive authentication result 17 based on fact values of request 11 and user data in database 16. Further details regarding the generation of adaptive authentication result 17 are described below.

During operation, authentication requestor 18 sends request 11 to adaptive authentication device 14 via network interface 26. Processor 22 stores data such as the username, fact values and timestamp from request 11 in memory 24. Processor 22 accesses a baseline database and performs a lookup operation on the username; that is, processor 22 compares the username to user identifiers in each entry of the baseline database and chooses those entries having a user identifier which matches the username.

The lookup operation will result in several entries from the baseline database, each of whose user identifiers matches the username stored in memory 24 but has user data corresponding to a time interval. The time intervals of the entries of the database that have a user identifier that matches the username of request 11 are distinct and non-overlapping.

Processor 22 then combines the fact values stored in memory 24 with the fact values in the entry of the baseline database that corresponds to the current time interval. For a more detailed discussion of suitable Adaptive Authentication systems, see for example, U.S. patent application Ser. No. 13/246,937, filed Sep. 28, 2011, entitled "Using Baseline Profiles In Adaptive Authentication," now U.S. Pat. No. 8,621,586; and/or United States Patent Application entitled "Techniques for Authenticating Users of Massive Multiplayer Online Role Playing Games Using Adaptive Authentication," now U.S. Pat. No. 8,856,923, each incorporated by reference herein FIG. 4 illustrates an exemplary application programming interface (API) 400 that a product 5 can use in accordance with aspects of the invention to retrieve KPIs from a monitored component 19. Generally, the API 400 specifies a list of data elements that the product 5 can retrieve from the monitored component 19.

In one embodiment, the exemplary API 400 is implemented as a Managed Bean (MBean) of the Java Management Extensions (JMX) specification (http://www.oracle.com/technetwork/java/javase/tech/docs-jsp-135989.html). In this manner, the product 5 can optionally use JMX technology to expose KPIs to a monitoring object 16. In the exemplary API 400, classes can be dynamically loaded and instantiated. The MBean represents a resource running in the Java virtual machine and can be used to collect KPI statistics.

FIG. 5 illustrates an exemplary implementation of a statistics collector object 500 (RiskEngineStatsCollector) that collects measurements in accordance with aspects of the invention. In accordance with one aspect of the invention, a statistics collector object 500 is established for each desired context of the KPI. As shown in FIG. 5, an indicator value is updated (e.g., incremented) for a corresponding instance of the statistics collector object 500 when an activity occurs for the associated context of the KPI. The Get command is used to return the monitored values to the product 5.

FIG. 6 illustrates exemplary pseudo code 600 that can be employed by the monitored components 19 of FIG. 1 to collect the KPI information with the granularity specified by the product 5 of FIG. 1. Generally, the exemplary pseudo code 600 allows the monitored components 19 to collect data regarding the number of failed analyze requests.

In this manner, setting the RiskEngineStatsCollector instance using a setter method allows the product 5 to control the granularity of the KPIs. For example, a product 5 can choose to expose the KPIs for the entire application, in which case it will create a single RiskEngineStatsCollector instance. A product 5 that would like KPIs with greater granularity, such as KPI data for every tenant, will create a RiskEngineStatsCollector instance for every context (e.g., for each tenant in a multi-tenant cloud service). In addition, a product 5 that would like KPIs divided by channels (e.g., Web, Mobile and Phone) and by tenants will create a RiskEngineStatsCollector instance for every context (e.g., for each encountered combination of tenant and channel).

In a further variation, different contexts can be monitored in the same request. If, for example, the exemplary adaptive authentication device 14 would like to monitor the number of requests per tenant and the number of requests per channel (e.g., web, mobile and phone) it would need to set more than one RiskEngineStatsCollector instance in the Risk Engine 19. The setter method in FIG. 6 can be changed to accept a plurality of RiskEngineCollector instances. Then, the code incrementing the indicator would be configured to do so for every instance in the collection of instances.

FIG. 7 illustrates exemplary pseudo code 700 that can be employed by the product 5 of FIG. 1 to monitor the KPIs having the desired granularity. The exemplary pseudo code 700 comprises an MBeanServer (Java monitor) in accordance with the JMX specification.

Figure 8:
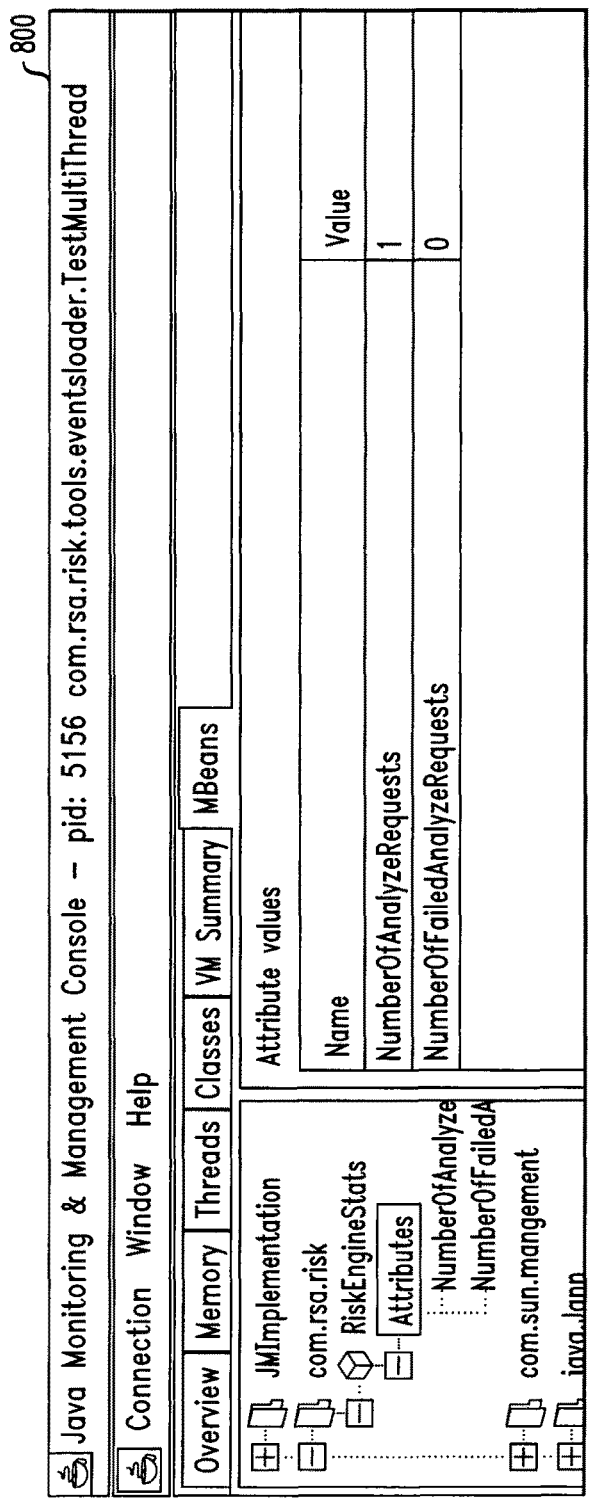
FIG. 8 illustrates an exemplary monitoring and management console to report the collected KPIs.

FIG. 8 illustrates an exemplary monitoring and management console 800 to report the collected KPIs. As shown in FIG. 8, when the product 5 queries the KPIs using the exemplary JMX specification, the KPI values are provided. In the example of FIG. 8, the monitored KPIs comprise a number of analyze requests and a number of failed analyze requests.

As mentioned previously herein, the above-described embodiments of the invention are presented by way of illustrative example only. Numerous variations and other alternative embodiments may be used. For example, while the exemplary embodiment implements the statistics collector objects using the JMX specification, other specifications and data formats can be employed. In addition, while a number of exemplary combinations of products 5 and monitored components 19 are discussed, the present invention can be applied to any product that incorporates a monitored component, as would be apparent to a person of ordinary skill in the art.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide improved monitoring techniques for use in monitored components that are incorporated into products. Advantageously, the illustrative embodiments do not require changes to existing communication protocols. It is therefore transparent to both existing applications and communication protocols.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of credentials or authentication information, and other types of access-controlled resources. Also, the particular configuration of system elements shown in FIGS. 1-3, and their interactions as shown in FIG. 3, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method performed using at least one processing device executing a software product, comprising:

specifying, by said software product, a granularity of a key performance indicator to be monitored by a monitored component embedded in said software product, wherein said monitored component is provided by a different entity than a provider of said software product, wherein said key performance indicator comprises a plurality of monitored contexts to be monitored, wherein said software product specifies said granularity using an application programming interface;

instantiating, using said at least one processing device executing said software product and based on said specified granularity, at least one distinct instance of a statistics collector object to execute for each monitored context of said plurality of monitored contexts of said key performance indicator provided by said monitored component embedded in said software product, wherein each of said at least one distinct instance of said statistics collector object is executed by said at least one processing device executing said software product, wherein each distinct instance of said statistics collector object collects information for a different context of said key performance indicator such that a given distinct instance of said statistics collector object collects information for said monitored context of said key performance indicator corresponding to said given instance and updates, using said at least one processing device executing said software product, an indicator value stored in at least one record in at least one memory when an activity occurs for said corresponding key performance indicator; and providing, using said at least one processing device executing said software product, said indicator value for a given context of said key performance indicator to a monitoring object.

2. The method of claim 1, wherein said at least one distinct instance of said statistics collector object for each monitored context of said key performance indicator allows different contexts of said key performance indicator to be monitored and reported.

3. The method of claim 1, wherein said key performance indicator corresponds to one or more of performance, time to complete a task, resource usage and maintenance issues related to said monitored component.

4. The method of claim 1, wherein said monitored component comprises one or more of a risk engine, a prediction engine, a rule engine, a rule base and a hardware device.

5. The method of claim 1, wherein said key performance indicator comprises a performance measurement.

6. The method of claim 5, wherein the software product comprises an authentication product.

7. A non-transitory machine-readable recordable storage medium, wherein one or more software programs when executed by one or more processing devices implement the following steps:

specifying, by a software product, a granularity of a key performance indicator to be monitored by a monitored component embedded in said software product, wherein said monitored component is provided by a different entity than a provider of said software product, wherein said key performance indicator comprises a plurality of monitored contexts to be monitored, wherein said software product specifies said granularity using an application programming interface;

instantiating, using said at least one processing device executing said software product and based on said specified granularity, at least one distinct instance of a statistics collector object to execute for each monitored context of said plurality of monitored contexts of said key performance indicator provided by said monitored component embedded in said software product, wherein each of said at least one distinct instance of said statistics collector object is executed by said at least one processing device executing said software product, wherein each distinct instance of said statistics collector object collects information for a different context of said key performance indicator such that a given distinct instance of said statistics collector object collects information for said monitored context of said key performance indicator corresponding to said given instance and updates, using said at least one processing device executing said software product, an indicator value stored in at least one record in at least one memory when an activity occurs for said corresponding key performance indicator; and providing, using said at least one processing device executing said software product, said indicator value for a given context of said key performance indicator to a monitoring object.

8. An apparatus, comprising:
a memory; and
at least one processing device, coupled to the memory, operative to implement the following steps:

specify, by a software product, a granularity of a key performance indicator to be monitored by a monitored component embedded in said software product, wherein said monitored component is provided by a different entity than a provider of said software product, wherein said key performance indicator comprises a plurality of monitored contexts to be monitored, wherein said software product specifies said granularity using an application programming interface;

instantiate, using said at least one processing device executing said software product and based on said specified granularity, at least one distinct instance of a statistics collector object to execute for each monitored context of said plurality of monitored contexts of said key performance indicator provided by said monitored component embedded in said software product, wherein each of said at least one distinct instance of said statistics collector object is executed by said at least one processing device executing said software product, wherein each distinct instance of said statistics collector object collects information for a different context of said key performance indicator such that a given distinct instance of said statistics collector object collects information for said monitored context of said key performance indicator corresponding to said given instance and updates, using said at least one processing device executing said software product, an indicator value stored in at least one record in at least one memory when an activity occurs for said corresponding key performance indicator; and provide, using said at least one processing device executing said software product, said indicator value for a given context of said key performance indicator to a monitoring object.

9. The apparatus of claim 8, wherein said at least one distinct instance of said statistics collector object for each monitored context of said key performance indicator allows different contexts of said key performance indicator to be monitored and reported.

10. The apparatus of claim 8, wherein said key performance indicator comprises a performance measurement.

11. The apparatus of claim 8, wherein said key performance indicator corresponds to one or more of performance, time to complete a task, resource usage and maintenance issues related to said monitored component.

12. The apparatus of claim 8, wherein said monitored component comprises one or more of a risk engine, a prediction engine, a rule engine, a rule base and a hardware device.

13. A monitored component executed by at least one processing device for collecting a key performance indicator related to execution of a software product, comprising:

a plurality of distinct statistics collector object instances for embedding in said software product, wherein said plurality of distinct statistics collector object instances are executed by said at least one processing device executing said software product, wherein said monitored component is provided by a different entity than a provider of said software product, wherein said key performance indicator comprises a plurality of monitored contexts to be monitored and wherein each instance of the plurality of distinct instances of said statistics collector object collects information for a different context of said plurality of monitored contexts of key performance indicator such that a given instance of said statistics collector object collects information for a given monitored context of said plurality of monitored contexts of said key performance indicator corresponding to said given instance and updates, using said at least one processing device, an indicator value stored in at least one record in at least one memory when an activity occurs for said corresponding key performance indicator; and an application programming interface (API) used by said software product to instantiate, based on a specification by said software product of a granularity of said key performance indicator to be monitored by said monitored component, one of said plurality of distinct instances of said statistics collector object for each monitored context of said key performance indicator to provide, using said at least one processing device executing said software product, said indicator value for a given context of said key performance indicator to a monitoring object, wherein said software product specifies said granularity using said API.

14. The monitored component of claim 13, wherein said plurality of distinct instances of said statistics collector object for each monitored context of said key performance indicator allows different contexts of said key performance indicator to be monitored and reported.

15. The monitored component of claim 13, wherein said key performance indicator corresponds to one or more of performance, time to complete a task, resource usage and maintenance issues related to said monitored component.

16. The monitored component of claim 13, wherein said key performance indicator comprises a performance measurement.

17. The monitored component of claim 13, wherein said monitored component comprises one or more of a risk engine, a prediction engine, a rule engine, a rule base and a hardware device.

18. The non-transitory machine-readable recordable storage medium of claim 7, wherein said monitored component comprises one or more of a risk engine, a prediction engine, a rule engine, a rule base and a hardware device.

* * * * *